United States Patent
Colosseo et al.

(10) Patent No.: US 10,124,397 B2
(45) Date of Patent: Nov. 13, 2018

(54) METHOD FOR PRODUCING A CAMSHAFT FOR AN INTERNAL-COMBUSTION ENGINE

(71) Applicant: C.R.F. Societa Consortile per Azioni, Orbassano (Turin) (IT)

(72) Inventors: Marco Colosseo, Cumiana (IT); Daniele Bassan, Rivalta di Torino (IT)

(73) Assignee: C.R.F. SOCIETA CONSORTILE PER AZIONI, Orbassano (Turin) (IT)

(*) Notice: Subject to any disclaimer, the term of this patent is extended or adjusted under 35 U.S.C. 154(b) by 144 days.

(21) Appl. No.: 14/654,163

(22) PCT Filed: Jul. 4, 2013

(86) PCT No.: PCT/IB2013/055466
§ 371 (c)(1),
(2) Date: Jun. 19, 2015

(87) PCT Pub. No.: WO2014/096988
PCT Pub. Date: Jun. 26, 2014

(65) Prior Publication Data
US 2015/0343519 A1     Dec. 3, 2015

(30) Foreign Application Priority Data

Dec. 20, 2012  (EP) ................................. 12198377

(51) Int. Cl.
*B21K 1/06* (2006.01)
*B21D 26/033* (2011.01)
*B21D 26/047* (2011.01)
*F01L 1/047* (2006.01)
*F16C 3/02* (2006.01)
(Continued)

(52) U.S. Cl.
CPC .............. *B21K 1/06* (2013.01); *B21D 26/033* (2013.01); *B21D 26/037* (2013.01);
(Continued)

(58) Field of Classification Search
CPC .. B21D 53/845; B21D 26/033; B21D 26/047; B21D 51/16; B21D 26/039–26/041;
(Continued)

(56) References Cited

U.S. PATENT DOCUMENTS 3,845,667 A * 11/1974 Honrath ................ B21D 26/14
                                                         72/56
5,040,294 A *  8/1991 Harle .................... B21K 1/063
                                                         29/6.01
(Continued)

FOREIGN PATENT DOCUMENTS

EP      0 906 800 A1    4/1999
JP      S59 113944 A    6/1984
(Continued)

OTHER PUBLICATIONS

International Search Report for International Application No. PCT/IB2013/055466, dated Sep. 27, 2013.

*Primary Examiner* — Matthew P Travers
(74) *Attorney, Agent, or Firm* — Victor A. Cardona; Heslin Rothenberg Farley & Mesiti P.C.

(57) ABSTRACT

A method for obtaining a camshaft for an internal-combustion engine having a structure made of a single piece includes obtaining the camshaft by starting from a metal tubular element. The cams are obtained by expanding the tubular element within a die using high-pressure fluid. The tubular element can have an enlarged thickness in portions that are to form the cams. Forming with high-pressure fluid can be obtained using gas or liquid (for example, water or oil) at high pressure, at room temperature or at a higher temperature. The piece obtained is subjected to thermal treatment and to a grinding operation.

12 Claims, 4 Drawing Sheets

(51) Int. Cl.
*B21D 53/84* (2006.01)
*F16H 53/02* (2006.01)
*B21D 26/037* (2011.01)

(52) U.S. Cl.
CPC ......... *B21D 26/047* (2013.01); *B21D 53/845* (2013.01); *F01L 1/047* (2013.01); *F16C 3/02* (2013.01); *B23P 2700/02* (2013.01); *F16C 2360/18* (2013.01); *F16H 53/025* (2013.01); *Y10T 29/49293* (2015.01); *Y10T 29/49805* (2015.01)

(58) Field of Classification Search
CPC .... B23P 2700/02; B23P 2700/07; F16C 3/08; F16C 2360/18; F16C 2220/42; Y10T 29/17; Y10T 29/49286; Y10T 29/49293; Y10T 29/49805; F16H 53/025; F01L 2001/0475
See application file for complete search history.

(56) References Cited

U.S. PATENT DOCUMENTS

| | | | | |
|---|---|---|---|---|
| 5,992,197 | A | * | 11/1999 | Freeman ............... B21D 26/033 29/421.1 |
| 6,261,392 | B1 | * | 7/2001 | Sundgren ............. B21D 26/033 148/590 |
| 6,442,987 | B1 | * | 9/2002 | Worringer ........... B21D 26/033 72/58 |
| 2003/0221514 | A1 | | 12/2003 | Amborn |
| 2011/0011253 | A1 | * | 1/2011 | Fonte ........................ B21J 5/00 89/14.05 |

FOREIGN PATENT DOCUMENTS

| | | |
|---|---|---|
| JP | 2000 192805 A | 7/2000 |
| WO | 99/20414 A1 | 4/1999 |

* cited by examiner

METHOD FOR PRODUCING A CAMSHAFT FOR AN INTERNAL-COMBUSTION ENGINE

CROSS REFERENCE TO RELATED APPLICATIONS

This application is a national stage filing under section 371 of International Application No. PCT/IB2013/055466, filed on Jul. 4, 2013, and published in English on Jun. 26, 2014, as WO 2014/096988 A1, and claims priority of European application No. 12198377.9 filed on Dec. 20, 2012, the entire disclosure of these applications being hereby incorporated herein by reference.

BACKGROUND ART

The present invention relates to methods used for producing camshafts of internal-combustion engines, of the type in which a metal tubular element is expanded by introducing a high-pressure fluid therein. A method of this type is, for example, described and illustrated in the document No. WO 2003/033189. According to the above known technique, the camshaft is obtained by mounting a series of annular elements that are to define the cams on a tubular element and by expanding the tubular element with a hydroforming operation in order to secure the aforesaid annular elements to the tubular element. There are on the other hand known alternative methods of production in which the annular elements defining the cams are secured to the tubular element by expanding the latter by means of a mechanical action, with the aid of an expansion mandrel. The known methods described above have been proposed and used as an alternative to more conventional methods, which envisage obtaining a camshaft in a single piece, by means of a conventional forging operation.

A method as set forth in the preamble of claim 1 is known from WO 99/20414 A1. Similar methods are known from JP 2000 192805 A, EP 0 906 800 A1, US 2003/221514 A1, JP S59 113944 A.

The object of the present invention is to provide a camshaft for an internal-combustion engine by means of a forming operation using high-pressure fluid, in particular by hydroforming or by forming with gas at a high pressure to obtain at the same time a camshaft structure in a single piece.

With a view to achieving the above purpose, the subject of the invention is a method having the features of claim 1.

BRIEF SUMMARY OF INVENTION

The forming operation using high-pressure fluid may be performed cold or hot, with liquid (for example, water or oil) or with gas. For instance, the forming operation using high pressure fluid expansion mandrel be performed by means of gas, such as for example nitrogen, at a pressure of between 400 and 800 bar and at a temperature of between 800° C. and 950° C.

As an alternative, the forming operation using high-pressure fluid may be a hydroforming operation performed by means of water or oil at a pressure of between 2000 and 3000 bar, at room temperature or higher.

In a first embodiment, the portions of enlarged thickness of the tubular element that is set in the die are obtained by subjecting a tubular element initially of uniform thickness to a preliminary operation of permanent deformation by means of flow-forming, which is performed by setting the tubular element in rotation and by applying around it rotating forming rollers that are displaced along the tubular element keeping them pressed against the tubular element.

In one variant, in the case where the tubular element is made of aluminium or its alloys, it is obtained with contiguous portions of different thickness by means of an extrusion process.

In another embodiment, said tubular element is obtained with contiguous portions of different thickness by means of bending and welding of a metal sheet having portions of different thickness.

The tubular element may, for example, be made of case-hardening steel, such as 22MnB5 boron steel.

Preferably, each of the widened portions of the cavity of the die has opposite ends having a diameter that varies progressively between a minimum value and a maximum value so that the cams of the camshaft are obtained with a corresponding conformation, including opposite ends having a diameter that varies progressively between a minimum value and a maximum value.

There may be envisaged the use of a composite die, with radially mobile parts in regions corresponding to the portions of the tubular element that are to form the cams. In this case, it may be envisaged that during the forming operation using high-pressure fluid the aforesaid mobile parts are displaced radially outwards in successive steps, one after another, so as to form said cams one at a time.

It may also be envisaged that the die is provided with heating means in positions corresponding to the portions of the cavity of the die that are to form the cams of the camshaft so as to obtain a localized case-hardening of the cams following upon the forming operation by means of pressurized fluid.

In general, if the forming operation using high-pressure fluid is performed hot, the piece obtained can be already case-hardened. Otherwise, following upon the forming operation using high-pressure fluid, an operation of thermal treatment is carried out.

According to a further characteristic, the niece obtained with the method described above is finally subjected to a grinding operation.

Further characteristics and advantages of the invention will emerge from the ensuing description with reference to the annexed drawings, which are provided purely by way of non-limiting example and in which:

BRIEF DESCRIPTION OF THE DRAWING FIGURES

DETAILED DESCRIPTION

Figure 1:
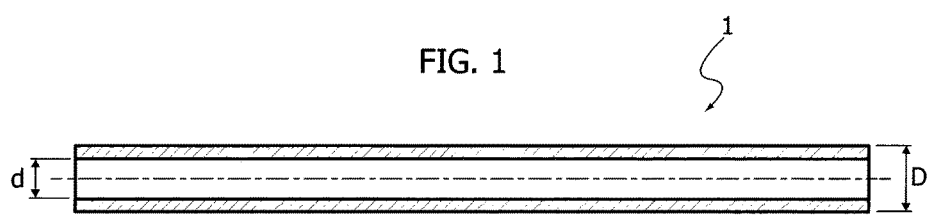
FIG. 1 is a cross-sectional view of a tubular element that must be subjected to the method according to the invention, according to an example of embodiment.

In FIG. 1, the reference number 1 designates as a whole a tubular element made, for example, of 22MnB5 boron steel. In a concrete example of embodiment, the tubular element 1 had a length L=500 mm and internal and external diameters d=27 mm and D=30 mm.

Figure 2:
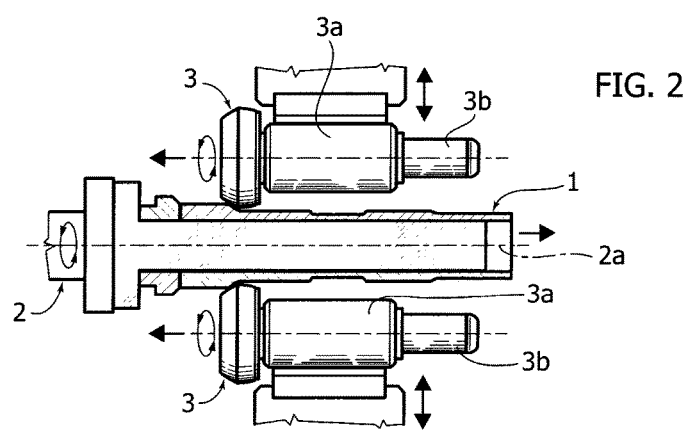
FIG. 2 is a schematic illustration of the device used for the preliminary operation of flow-forming of the tubular element.

In the embodiment illustrated, the semi-finished product 1 is first of all subjected to a flow-forming operation by means of an apparatus such as the one illustrated schematically in FIG. 2. The tubular element 1 is mounted on a mandrel 2, which is set in rotation about its axis 2a by motor means (not visible in the drawing). Whilst the tubular element 1 is set in rotation, a plurality of forming rollers 3 are displaced axially around it. Each forming roller 3 thus presents both a movement of rotation about its axis and a movement of translation in a direction parallel to the axis 2a. Moreover, each support. 3a of each forming roller 3 is pushed radially in such a way that each roller 3 exerts a high pressure against the wall of the tubular element 1. FIG. 2 does not illustrate the motor means associated to the shaft 3b of each forming roller 3.

Figure 3:
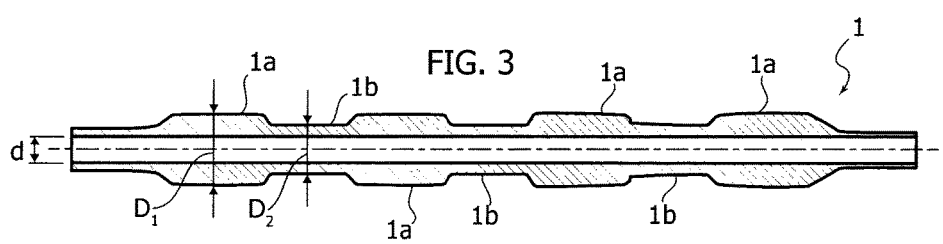
FIG. 3 is a cross-sectional view of the tubular element after the preliminary flow-forming operation.
Figure 4:
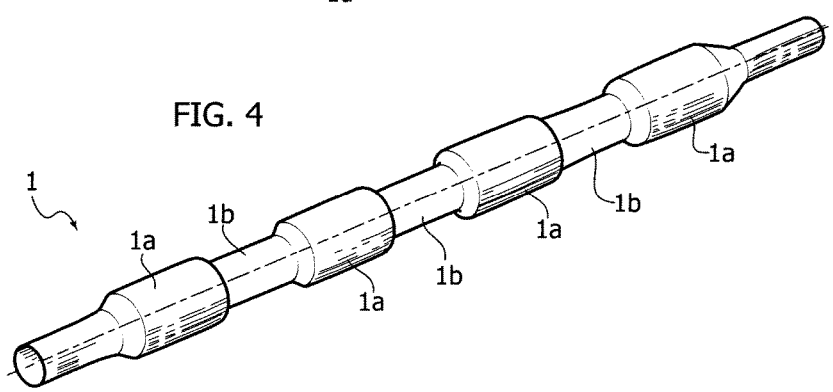
FIG. 4 is a perspective view of the tubular element illustrated in FIG. 3.

As a result of the aforesaid preliminary flow-forming operation, the tubular element 1 assumes the shape illustrated in FIGS. 3 and 4, including a plurality of portions 1a of enlarged thickness that are to define the cams of the camshaft. The portions 1a are set at an axial distance apart from one another by portions 1b having a smaller outer diameter. The inner diameter of the tubular element 1 is, instead, constant throughout its length, as may be seen in FIG. 3.

In the aforesaid concrete, example, of embodiment, the inner diameter of the tubular element 1 obtained after the preliminary flow-forming operation was d=22 mm, whereas the outer diameter of the portions 1a and 1b was $D_1$=30 mm and $D_2$=25 mm.

As may be seen in FIG. 4, the portions 1a of the tubular element 1 obtained after the preliminary flow-forming operation may have axial lengths different from one another, according to the desired conformation of the camshaft.

FIGS. 5A-5F a schematic illustrations of the various steps of the forming operation using high-pressure fluid, to which the tubular element 1 obtained following upon the preliminary flow-forming operation is subjected. The figures show schematically the method with reference to a theoretical piece of small length including a single portion that is to define a single cam. It is evident that in the concrete embodiment, both the piece and, consequently, the die have a larger axial dimension. Likewise, the die is illustrated in the annexed drawings as including a main cavity with a single widened portion that is to define a single cam of the camshaft. It is evident that in the concrete embodiment the cavity of the die has a more extensive axial dimension, and its cavity has a plurality of widened portions set axially apart from one another that are to define the various cams of the camshaft.

Figure 5A:
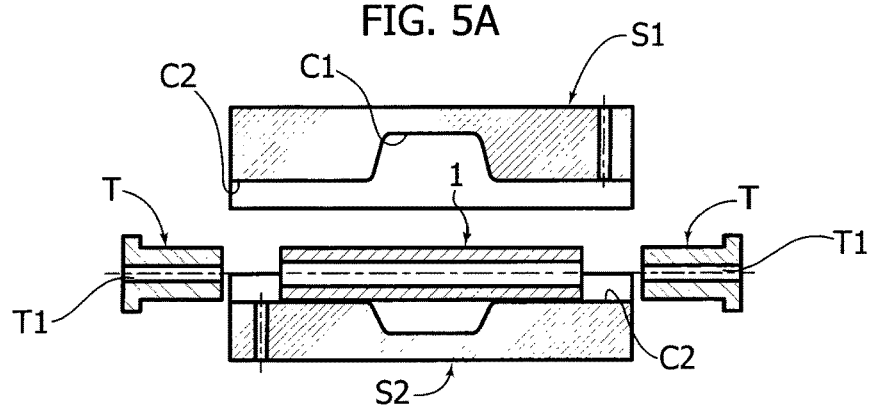
FIGS. 5A-5F are schematic illustrations of the various steps of the forming operation using high-pressure fluid.

FIG. 5A shows the preliminary step, in which the tubular element 1 obtained following upon the preliminary flow-forming operation is positioned in the die. The die for hydroforming is illustrated in the annexed drawings in simplified form as including a top die element S1 and a bottom die element 82 that can displace vertically with respect to one another between an open condition, where they are set apart, which enables introduction of the piece to be formed or extraction of the piece that has been formed (see FIGS. 5A and 5F), and a closed condition where they are set close to one another for carrying out the forming operation (see FIGS. 5B-5E).

The annexed drawings do not show the hydroforming machine within which the die is positioned either. Said machine may be obtained in any known way. In particular, it is possible to make use of a hydroforming machine such as the one forming the subject of the document No. EP 1 992 427 A1 filed in the name of the present applicant.

In the initial step illustrated in FIG. 5A, the two die elements S1, S2 are in the open condition to enable positioning of the tubular element 1 within the die. In the drawings of FIGS. 5A-5F, the tubular element is illustrated as theoretical tubular element, with constant outer diameter and constant inner diameter. However, as has already been mentioned, according to the invention the tubular element is inserted into the forming die, after being previously subjected to the flow-forming operation described above, following upon which it has the portions 1A of enlarged thickness that are to constitute the cams of the camshaft.

Figure 5B:
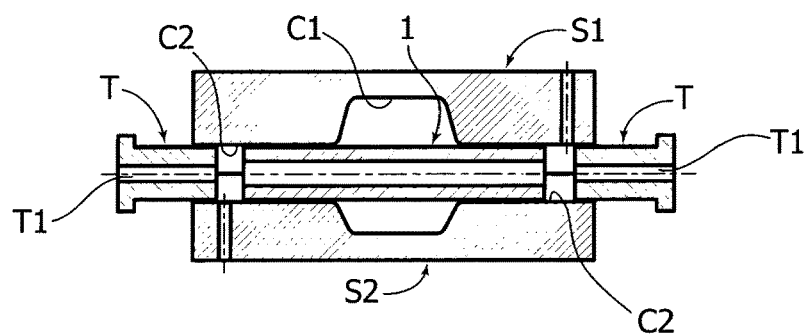

FIG. 5B shows the step in which the die elements S1, S2 are closed after introduction of the element 1 between them. In this condition, the two elements S1, S2 define a substantially cylindrical axial cavity, which gives out at its two opposite ends onto the opposite ends of the die elements S1, S2. In areas corresponding to each portion 1a of the tubular element 1 that is to form a cam, the cavity of the die has a widened portion C1. In the concrete embodiment, the cavity of the die has a plurality of widened portions C1 set axially apart from one another by cylindrical portions C2.

The opposite ends of the cavity of the die are closed by two cylindrical closing elements T, each having an axial channel T1 connected to a circuit for supply of high-pressure fluid.

As has already been mentioned above, the method according to the invention envisages both use of a liquid at high pressure in a hydroforming process (for example, water or hot oil) and, as an alternative, use of a gas (inert gas) at a high pressure (for example, nitrogen).

Figure 5C:
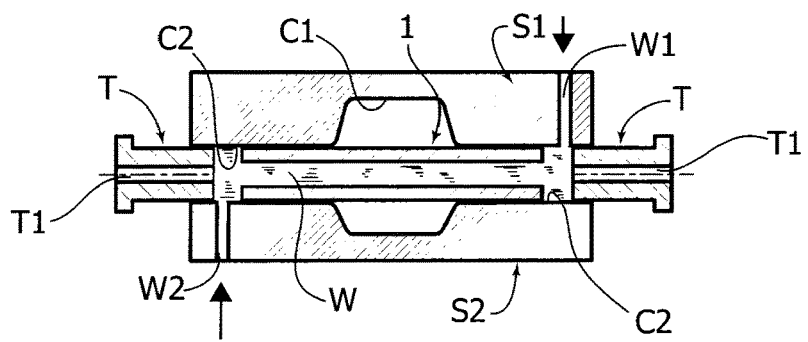

FIG. 5C shows the subsequent step in which the internal cavity of the die is filled with fluid (water W in the typical example of embodiment), getting it to flow through channels W1, W2 made through the die elements S1, S2.

Figure 5D:
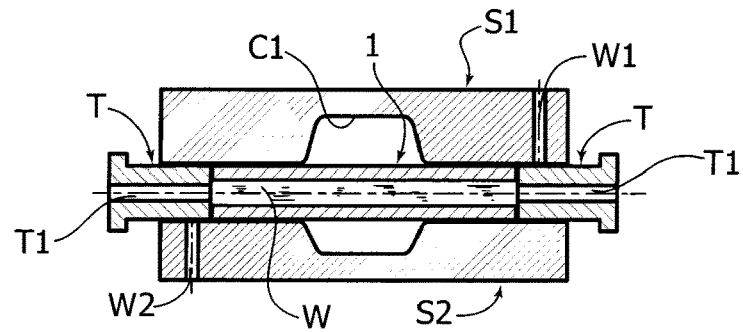

FIG. 5D shows a subsequent step in which the closing elements T are made to advance axially until they come into contact with the end of the tubular element 1, so as to isolate the chamber inside the tubular element 1 from the channels W1, W2.

Figure 5E:
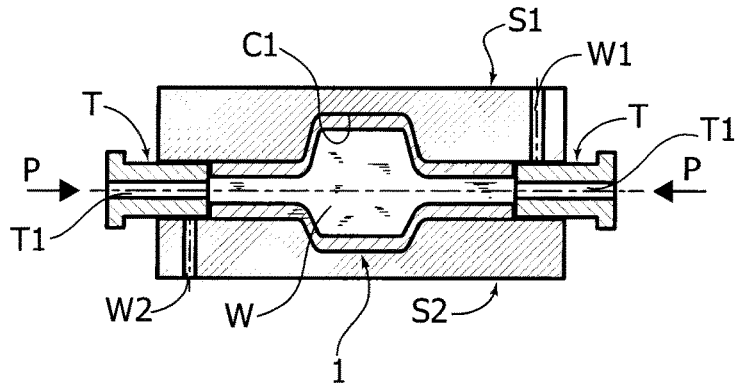

FIG. 5E shows the subsequent step in which the cavity inside the tubular element 1 is connected to the high-pressure pressure circuit P in such a way that the tubular element 1 is forced to expand within the widened cavity C1 by the water at high pressure contained therein.

As may be seen in the example of embodiment illustrated, each widened portion C1 of the cavity of the die has opposite ends having a diameter that varies progressively between a minimum value and a maximum value so that also the deformed portion of the tubular element 1 that defines each cam assumes a corresponding configuration, with axially opposite ends having a diameter that varies progressively between minimum value and a maximum value.

Figure 5F:
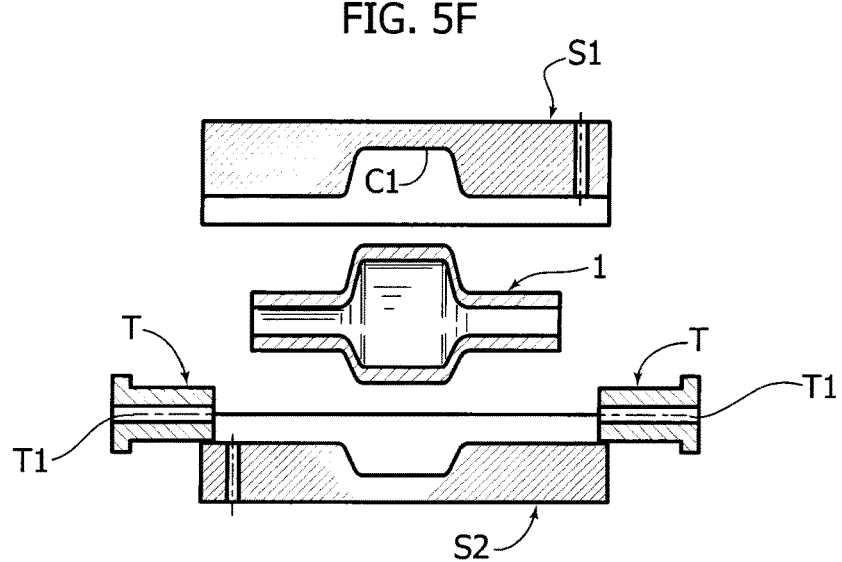
Figure 6:
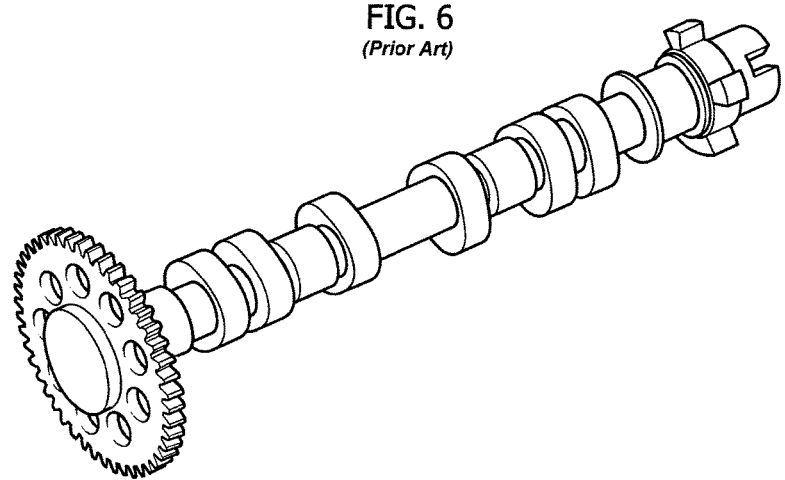
FIGS. 6 and 7 are perspective views that show, respectively, a camshaft according to the conventional technique and a camshaft obtained with the method according to the invention.

FIG. 5F shows the step in which, after the end of forming the tubular element, the die is opened, and the tubular element is extracted to be subjected to an operation of thermal treatment (case-hardening) and to a subsequent grinding operation.

Figure 7:
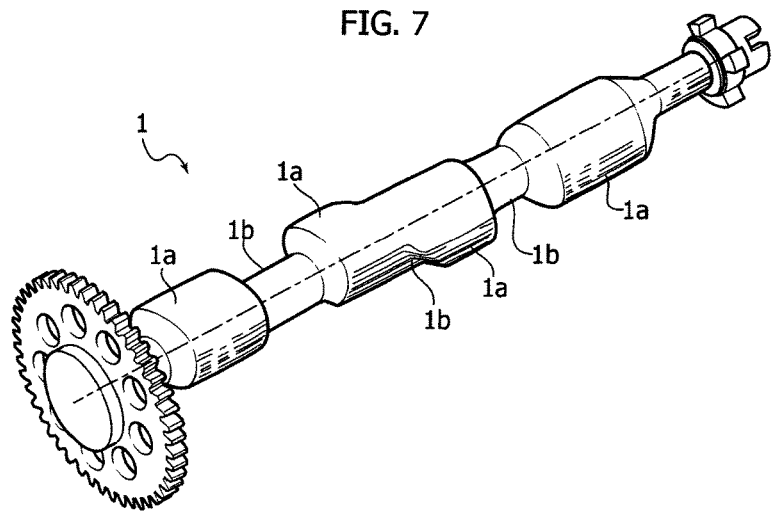

FIG. 7 shows an example of camshaft obtained with the method according to the invention compared with a functionally equivalent conventional shaft. In the camshaft of the invention the portions of the tubular element functioning as cam are designated by the reference 1a, whereas designated by 1b are the portions set between them, at least some of which are used for support in rotation of the camshaft by means of rolling bearings.

As already mentioned above, the forming process using high-pressure fluid may be carried out cold or else hot. In the case of the hot process, gas or oil is preferably used. The heating temperature is preferably comprised between 850° C. and 950° C., and is preferably around 900° C. With the above hot process, it is possible to obtain that the piece is already completely case-hardened following upon the forming operation.

As an alternative, the process can be carried out cold. It may also be envisaged that the die is provided with heating means for example, induction heating means) in positions corresponding to the portions of the cavity of the die that are to ions the cams so as to obtain an induction case-hardening of the cams during the forming operation.

Otherwise, the piece obtained is subjected to an operation of thermal treatment after the forming operation.

Finally, as has been said, the piece is subjected to a grinding operation.

There may also be envisaged a composite die, with portions that can displace radially in positions corresponding to the portions of the cavity of the die that are to form the cams. Dies of this type are known and have been proposed, for example, in the document. No. EP 1 579 931 A1 filed in the name of the present applicant for forming tubular elements with branchings. In this case, it is preferably envisaged that during the forming operation using high-pressure fluid the aforesaid mobile parts are displaced radially outwards in successive steps, one after another so as to form said cams one at a time.

Thanks to the characteristics referred to above, the method according to the invention enables a camshaft to be obtained in a single piece, with relatively simple and fast operations. The camshaft obtained with the method according to the invention presents advantages of greater lightness and greater stiffness as compared to camshafts of a conventional type. Moreover, the camshaft thus obtained is more reliable than camshafts in which the cams are constituted by separate annular elements associated to a tubular shaft that is expanded by means of hydroforming.

Of course, without prejudice to the principle of the invention, the details of construction and the embodiments may vary widely with respect to what has been described and illustrated herein purely by way of example, without thereby departing from the scope of the present invention.

In particular, as already mentioned above, as an alternative to the preliminary step of flow-forming, a tubular element may be provided with contiguous portions of different thickness, obtained, for example, by extrusion (in the case of aluminium) or by bending and welding of a metal sheet made up of portions of different thicknesses. Nor is there ruled out the use of a tubular element of uniform thickness for carrying out the forming operation using high-pressure fluid.

The invention claimed is:
1. A method for producing a camshaft for an internal-combustion engine, the method comprising:
    forming a metal tubular element comprising contiguous portions of different thicknesses, the tubular element having cam locating portions and non-cam locating portions, the cam locating portions having larger thicknesses than the non-cam locating portions;
    receiving the tubular element in a main cylindrical cavity of a die;
    said main cylindrical cavity comprising a plurality of cam forming cavities comprising widened portions set axially apart from one another by a plurality of non-cam forming areas, for forming the cams of a camshaft, the non-cam forming areas having interior surfaces for contacting the tubular element with smaller diameters than interior surfaces of the cam forming cavities;
    aligning a first portion of the cam locating portions with a first widened portion of the widened portions, aligning a second portion of cam locating portions with a second widened portion of the widened portions, aligning a third portion of the cam locating portions with a third widened portion of the widened portions;
    wherein each of said widened portions of the main cavity of the die has axially opposite ends having a diameter that varies progressively between a minimum value and a maximum value so that the cams of the camshaft are obtained with a corresponding shape, such that opposite ends of the cams have a diameter that tapers from a minimum value to a maximum value;
    introducing a high-pressure fluid in an interior cavity of said metal tubular element to expand said metal tubular element into a first cavity of said die and a second cavity of said die such that an outside surface of the tubular element contacts an inside surface of the die to form a first cam and a second cam, said first cavity comprising a first cavity of said plurality of cam forming cavities and said second cavity comprising a second cavity of said plurality of cam forming cavities, the first cam having a first cam shape corresponding to said first cavity and the second cam having a second cam shape corresponding to said second cavity;
    the first cam and the second cam comprising cams of a plurality of cams of the camshaft, the camshaft formed in a single piece;
    wherein the high-pressure fluid comprises a gas at a pressure of between 400 and 800 bar and at a temperature of between 850° C. and 950° C.; and
    wherein for the forming operation using high-pressure fluid a composite die is used, with radially mobile parts in positions corresponding to the portions of the tubular element that are to form the cams.

2. The method according to claim 1, wherein the forming the tube comprising contiguous portions of different thicknesses comprises subjecting the tubular element to flow-forming prior to expanding the metal tubular element by introducing the high-pressure fluid, the flow-forming comprising setting the tubular element in rotation and applying around it rotating forming rollers that are displaced along the tubular element, keeping them in pressure against the tubular element.

3. The method according to claim 1, wherein said tubular element is obtained with contiguous portions of different thickness using an extrusion process.

4. The method according to claim 1, wherein said tubular element is obtained with contiguous portions of different thickness by bending and welding of a metal sheet having portions of different thickness.

5. The method according to claim 1 wherein after the forming operation using high-pressure fluid, an operation of thermal treatment is performed.

6. The method according to claim 1, wherein during the forming operation using high-pressure fluid the aforesaid mobile parts are displaced radially outwards in successive steps, one after the other so as to form said cams one at a time.

7. The method according to claim 1, wherein the tubular element is made of a material chosen from among steel, aluminum, and their alloys.

8. The method according to claim 1, further comprising heating the die in positions corresponding to the portions of the cavity of the die that are to form the cams of the camshaft so as to obtain localized case-hardening of the cams following upon the forming operation using high-pressure fluid.

9. The method according to claim 1 wherein the first cam shape differs from the second cam shape.

10. The method according to claim 1 wherein the first cam abuts the second cam on the camshaft.

11. The method according to claim 1 wherein the first cam is axially separated from the second cam on the camshaft.

12. The method according to claim 1 wherein said first widened portion is axially separated from said second widened portion, and said second widened portion abutting said third widened portion.

* * * * *